US012798542B2

(12) United States Patent
Marx et al.

(10) Patent No.: US 12,798,542 B2
(45) Date of Patent: Nov. 17, 2026

(54) BRAKE SYSTEM AND METHOD FOR PERFORMING A FUNCTIONAL TEST OF THE BRAKE SYSTEM

(71) Applicant: ZF Active Safety GmbH, Koblenz (DE)

(72) Inventors: Andreas Marx, Hartenfels (DE); Nicholas Alford, Waldesch (DE); Frank Einig, Ochtendung (DE)

(73) Assignee: ZF Active Safety GmbH, Koblenz (DE)

( * ) Notice: Subject to any disclaimer, the term of this patent is extended or adjusted under 35 U.S.C. 154(b) by 902 days.

(21) Appl. No.: 18/074,945

(22) Filed: Dec. 5, 2022

(65) Prior Publication Data

US 2023/0192062 A1 Jun. 22, 2023

(30) Foreign Application Priority Data

Dec. 20, 2021 (DE) ........................ 102021133866.2

(51) Int. Cl.
*B60T 17/22* (2006.01)
*B60T 13/14* (2006.01)
(Continued)

(52) U.S. Cl.
CPC ............ *B60T 17/22* (2013.01); *B60T 13/142* (2013.01); *B60T 13/148* (2013.01); *B60T 13/58* (2013.01);
(Continued)

(58) Field of Classification Search
CPC ................. B60T 13/686; B60T 13/745; B60T 2270/406; B60T 2270/413; B60T 17/221; B60T 17/226
See application file for complete search history.

(56) References Cited

U.S. PATENT DOCUMENTS

2008/0208426 A1* 8/2008 Iwasaki ................. B60T 17/221 701/70
2013/0062932 A1* 3/2013 Yagashira ................. B60L 7/14 303/3

(Continued)

FOREIGN PATENT DOCUMENTS

| | | | |
|---|---|---|---|
| DE | 102014225958 | A1 | 6/2016 |
| DE | 102017000472 | A1 | 7/2018 |

OTHER PUBLICATIONS

ASME (American Society of Mechanical Engineers, "Graphic Symbols for Fluid Power Diagrams". 1967, New York, NY.) (Year: 1967).*

*Primary Examiner* — Bradley T King
(74) *Attorney, Agent, or Firm* — Kristin L. Murphy

(57) ABSTRACT

A brake system for a vehicle is provided. The brake system is designed to selectively apply pressure to and release it from at least two pressure connectors for brake actuators, and each of the pressure connectors can be coupled to an associated brake actuator of a wheel of the vehicle. The brake system has a master brake module and an auxiliary brake module, wherein the master brake module and the auxiliary brake module each have at least one sensor for detecting a fluid pressure in the respective brake module, and with a control unit which is configured to monitor and compare a fluid pressure in the master brake module and in the auxiliary brake module by the measured values detected by the sensors, and, based on the pressure and/or pressure curve, to draw a conclusion about the functional capability of the auxiliary brake module. A method is furthermore provided for performing a functional test of the brake system.

19 Claims, 2 Drawing Sheets

(51) Int. Cl.
*B60T 13/58* (2006.01)
*B60T 17/04* (2006.01)

(52) U.S. Cl.
CPC ......... *B60T 17/04* (2013.01); *B60T 2270/402* (2013.01); *B60T 2270/406* (2013.01); *B60T 2270/88* (2013.01)

(56) References Cited

U.S. PATENT DOCUMENTS

| | | | | |
|---|---|---|---|---|
| 2013/0169032 | A1* | 7/2013 | Linhoff | B60T 8/5081 303/3 |
| 2014/0203626 | A1* | 7/2014 | Biller | B60T 7/02 303/14 |
| 2019/0225205 | A1 | 7/2019 | Ganzel | |
| 2020/0139948 | A1* | 5/2020 | Leiber | B60T 8/4081 |
| 2020/0361439 | A1* | 11/2020 | Neu | B60T 13/146 |
| 2023/0174035 | A1* | 6/2023 | Chaumette | B60T 8/4018 303/10 |
| 2024/0083401 | A1* | 3/2024 | Overzier | B60T 17/222 |
| 2024/0157923 | A1* | 5/2024 | Leiber | B60T 17/22 |
| 2024/0375625 | A1* | 11/2024 | Leiber | B60T 8/885 |
| 2025/0042379 | A1* | 2/2025 | Haag | B60T 8/72 |
| 2025/0074378 | A1* | 3/2025 | Schuster | B60T 13/662 |

* cited by examiner

BRAKE SYSTEM AND METHOD FOR PERFORMING A FUNCTIONAL TEST OF THE BRAKE SYSTEM

CROSS-REFERENCE TO RELATED APPLICATION

This application claims priority to German Priority Application No. 102021133866.2, filed Dec. 20, 2021, the disclosure of which is incorporated herein by reference in its entirety.

TECHNICAL FIELD

The disclosure relates to a brake system, in particular a "brake-by-wire" brake system, and to a method for performing a functional test of the brake system.

BACKGROUND

In "brake-by-wire" systems, actuation of the brake pedal by a driver is detected electronically. Based on the detected actuation, an electrohydraulic actuator can be controlled centrally in order to actuate the brakes hydraulically in a conventional fashion, as is known, for example, in the case of IBC ("integrated brake control").

Because there is usually no mechanical connection between a brake pedal and the brakes in "brake-by-wire" brake systems, an additional fallback is generally implemented in order to be able to institute a braking procedure in the event of failure of the integrated brake system. The same problem occurs in self-driving mode because a driver does not actuate the brake pedal at all in self-driving mode and thus it is also not possible for a mechanical or hydraulic coupling between the brake pedal and the brakes to be used as a fallback at least in self-driving mode.

The fallback can be implemented in the form of an auxiliary brake module that can initiate a braking procedure independently of the integrated brake system.

Because the auxiliary brake module is normally activated only when there is a fault in the integrated brake system, it can occur that the auxiliary brake module is activated only very rarely or not at all over the whole life of the vehicle. The auxiliary brake module must nevertheless be ready to be used at all times in the event of failure of the integrated brake system.

In order to ensure this, it is possible to have the auxiliary brake module checked in a garage at regular intervals as part of a vehicle service. However, this means a lot of effort and high costs for the vehicle owner.

SUMMARY

What is needed is to provide a brake system with an auxiliary module, in which the functionality of the auxiliary brake module can be checked particularly simply.

Accordingly, a brake system for a vehicle is disclosed, for example a "brake-by-wire" brake system. The brake system is designed to selectively apply pressure to and release it from at least two pressure connectors for brake actuators, and each of the pressure connectors can be coupled to an associated brake actuator of a wheel of the vehicle. The brake system has a master brake module which comprises an electrofluidic pressure-generating unit which is designed to selectively pressurize a volume flow of hydraulic fluid and supply it to the pressure connectors. The brake system furthermore has an auxiliary brake module which is configured to supply a pressure to the pressure connectors independently of the master brake module, wherein the auxiliary brake module can be selectively coupled fluidically to the master brake module or fluidically disconnected therefrom. The master brake module and the auxiliary brake module each have at least one sensor for detecting a fluid pressure in the respective brake module. In addition, the brake system has a control unit which is configured to monitor and compare a fluid pressure in the master brake module and the auxiliary brake module by the measured values detected by the sensors, and, based on the pressure and/or pressure curve, to draw a conclusion about the functional capability of the auxiliary brake module.

The disclosure makes it possible to check the functionality of the auxiliary brake module at regular intervals simply without there being any need for the vehicle to brought into a garage to do this. The disclosure makes use of the information about what pressure conditions exist normally in the auxiliary brake module and/or in the master brake module when one of the two modules has been activated.

For example, a functional test can be performed without a driver being aware of it. In addition, with the brake systems according to the disclosure, the intervals at which a functional test is performed can, because of the small amount of effort, be short compared with a check in a garage. A high degree of operational safety is thus ensured without this being connected with additional effort for the vehicle owner. A notification prompting the vehicle owner to make a service appointment takes place only in the event of a fault.

Fluid pressure in the auxiliary brake module increases, for example, when the auxiliary brake module is activated whilst it is uncoupled from the master brake module. If the control unit establishes that there is no increase in pressure when the auxiliary brake module is activated, this is an indication that the auxiliary brake module has a fault and must be checked.

If, after the auxiliary brake module has been activated, the master brake module is coupled to the latter and the master brake module is then activated, it can then also be established, when there is a pressure equilibrium in the master brake module and in the auxiliary brake module, whether the auxiliary brake module has been engaged and with what intensity.

By virtue of the additional sensor for detecting a fluid pressure in the master brake module, the control unit can establish whether the pressure conditions in the whole brake system are consistent.

Both the master brake module and the auxiliary brake module are configured to actuate a brake actuator.

The master brake module corresponds to an integrated brake system.

According to one aspect, the auxiliary brake module comprises at least one auxiliary hydraulic fluid reservoir which is disconnected from a master hydraulic fluid reservoir of the master brake system. The fluid contained in the auxiliary hydraulic fluid reservoir is thus available in the auxiliary brake module even when the auxiliary brake module is fluidically disconnected from the master brake module. The auxiliary brake module can thus act completely independently of the master brake module.

The auxiliary hydraulic fluid reservoir comprises a smaller volume of fluid than the master hydraulic fluid reservoir, for example no more than one tenth of the volume of fluid of the master hydraulic fluid reservoir. The auxiliary hydraulic fluid reservoir can consequently be positioned particularly flexibly.

Starting from the master brake module, a supply line can run to the auxiliary hydraulic fluid reservoir. As a result, when the auxiliary brake module and the master brake module are fluidically coupled, the auxiliary hydraulic fluid reservoir can be filled when required with hydraulic fluid from the master brake module, from the master hydraulic fluid reservoir.

A non-return valve, which allows the auxiliary hydraulic fluid reservoir to be filled only when the pressure in the master brake module is greater than in the auxiliary brake module, can be arranged in the supply line.

The auxiliary brake module can comprise at least one pressure generator which is driven by an electric motor, for example a single-piston pump or a double-piston pump, which is configured to pressurize the hydraulic fluid present in the auxiliary hydraulic fluid reservoir and supply it at, at least one of the pressure connectors. Because a pressure generator is used which is driven by an electric motor, the auxiliary brake module can be activated quickly when required, i.e. a necessary brake pressure can be built up quickly when required.

For example, the auxiliary brake module comprises a fluid circuit in which are arranged the at least one pressure generator and the sensor for detecting the fluid pressure in the auxiliary brake module, and a valve which acts as a non-return valve in its closed position. The non-return valve allows the flow of fluid to the pressure connector. Hydraulic fluid can be pumped in a loop by the pressure generator through the fluid circuit in a functional test when no braking procedure is to be initiated. A pressure acting at the pressure connector is reduced as a result. The valve must be opened in this case. In the closed position, the valve can allow the passage of hydraulic fluid irrespective of a direction of flow. However, if a braking procedure is to be initiated by the auxiliary brake module, the valve must be closed. Hydraulic fluid can, as a result, flow only in the direction of the pressure connector.

In one exemplary arrangement, the valve is a proportional valve. A pressure at the pressure connector can be regulated accurately by the use of a proportional valve.

The at least one pressure generator is connected to an auxiliary hydraulic fluid reservoir in order to draw fluid in. The pressure generator can consequently draw in hydraulic fluid from the auxiliary hydraulic fluid reservoir in a start-up phase.

The fluid circuit begins, for example, downstream from the auxiliary hydraulic fluid reservoir. The advantage is consequently obtained that the hydraulic fluid does not flow back into the auxiliary hydraulic fluid reservoir whilst it is circulating in the fluid circuit.

The auxiliary brake module has a bypass path which bypasses the auxiliary hydraulic fluid reservoir, wherein the master brake module is fluidically connected to a pressure connector via the bypass path. The master brake module can thus convey hydraulic fluid to the pressure connector via the bypass path in order to initiate a braking procedure without hydraulic fluid flowing into the auxiliary hydraulic fluid reservoir. A braking procedure can thus be initiated with no delay immediately after the master brake module is activated.

In one exemplary arrangement, the bypass path bypasses the at least one pressure generator. When the pressure generator is not active, flow resistance through the pressure generator is usually increased. Because the bypass path bypasses the pressure generator, when a braking procedure is initiated by the master brake module, a required pressure is supplied at the pressure connector with no delay.

According to one aspect, a valve is arranged in the bypass path. As a result, the bypass path can be closed when the auxiliary module is activated.

In one exemplary arrangement, the valve in the bypass path is a switch valve.

For example, the valve in the bypass path acts in the closed state as a non-return valve in such a way that, when the valve is closed, although hydraulic fluid can flow to the pressure connector, it cannot flow away from it.

According to one aspect, a sensor unit for detecting a volume displaced by the electrofluidic pressure-generating unit is provided. The detection of the displaced volume serves as a plausibility check for the pressures detected by the sensors in the auxiliary brake module and in the master brake module. If an inconsistency is found here, it can imply a leak in the brake system.

A method for performing a functional test of the brake system according to the disclosure is also disclosed herein. According to the method according to the disclosure, the auxiliary brake module is first fluidically disconnected from the master brake module. Whilst the auxiliary brake module is disconnected from the master brake module, the auxiliary brake module is activated in order to generate a defined pressure in the auxiliary brake module. After the auxiliary brake module has been activated, it is coupled to the master brake module and the master brake module is activated. The control unit monitors and compares the pressure and/or pressure curve in the master brake module and in the auxiliary brake module and, based on the pressure and/or pressure curve, draws a conclusion about the functional capability of the auxiliary brake module.

As already explained above in connection with the brake system according to the disclosure, the advantage is consequently obtained that functionality of the auxiliary brake module can be checked particularly simply.

The auxiliary brake module can be coupled to the master brake module either for all the pressure connectors at the same time or one after the other for the individual pressure connectors. This means that the master brake module is fluidically connected to all the pressure connectors at the same time or it is connected only to the individual pressure connectors one after the other. In the first case, it is possible to check whether the auxiliary brake module as a whole is functional. In the second case, the individual fluid paths of the auxiliary brake module to the various pressure connectors can be checked individually.

According to one aspect, the auxiliary brake module is deactivated before the master brake module is activated. It can consequently be checked whether each of the two modules is individually functional.

For example, the control unit sends a signal to a vehicle acceleration unit when the auxiliary brake module is activated. It is consequently possible that in a functional test, a delay which may be caused by the functional test can be counteracted by additional acceleration.

BRIEF DESCRIPTION OF DRAWINGS

Further advantages and features of the disclosure arise from the following description and from the attached drawings, to which reference is made. In the drawings.

DETAILED DESCRIPTION

Figure 1:
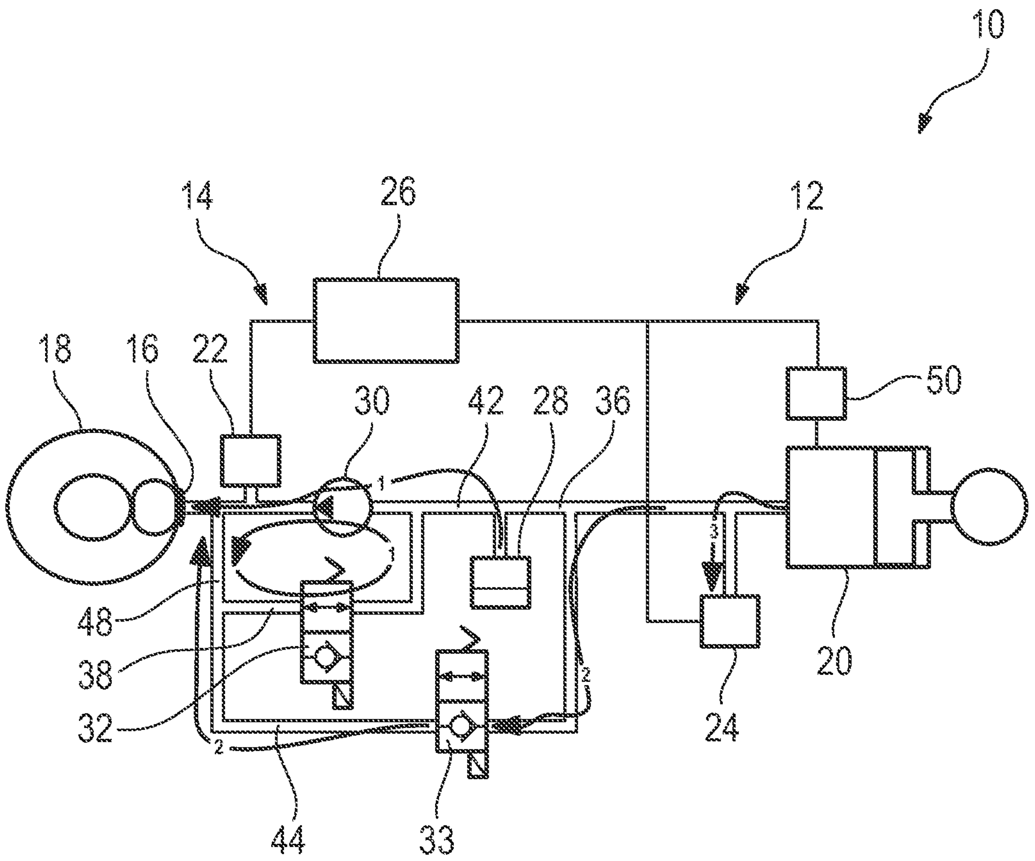
FIG. 1 shows schematically a brake system according to the disclosure.
Figure 2:
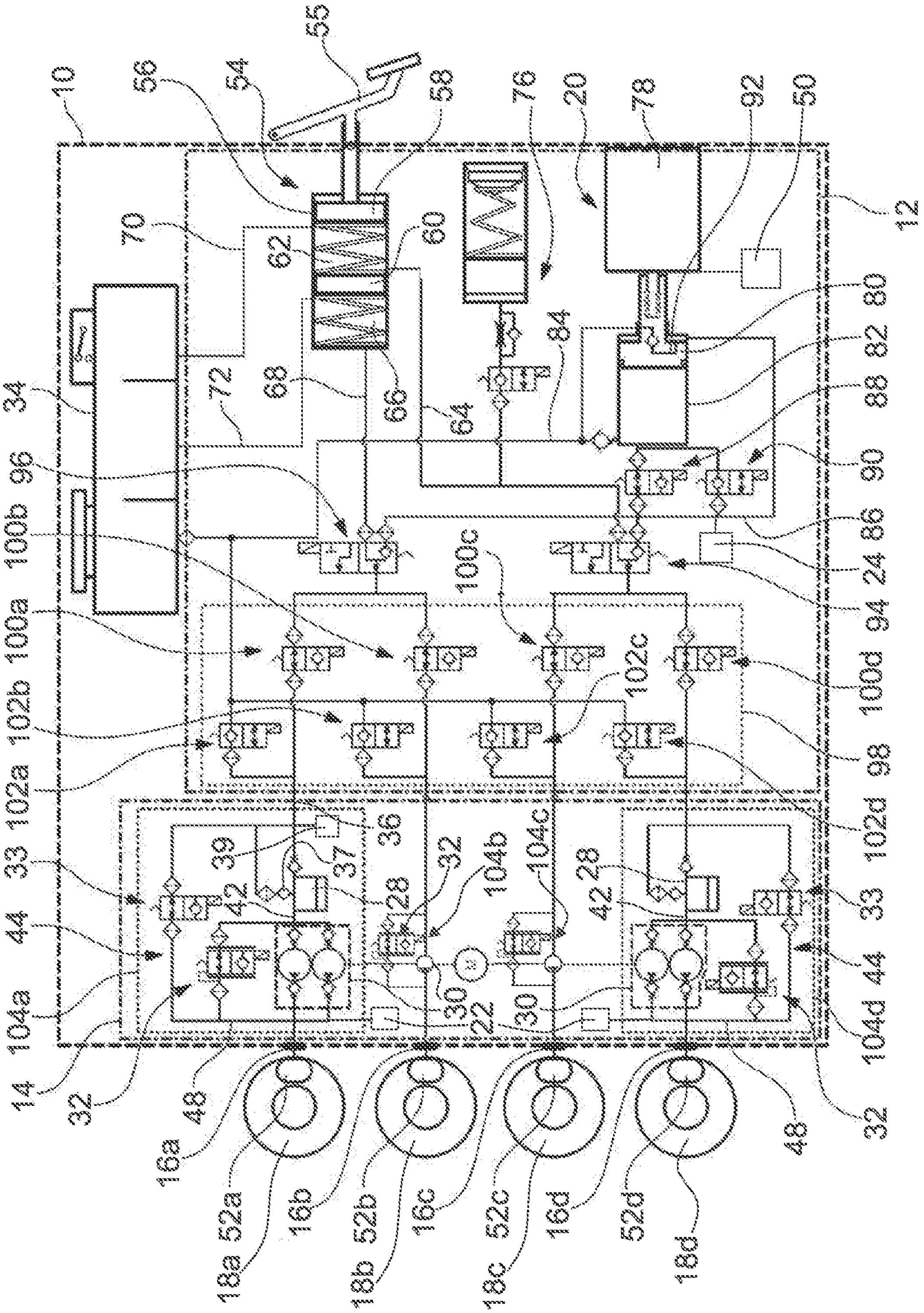
FIG. 2 shows the brake system according to the disclosure in a further schematic view.

FIGS. 1 and 2 both illustrate a brake system 10 for a vehicle with a master brake module 12 which is an integrated brake system, and with an auxiliary brake module 14 which represents a fallback of the master brake module 12.

FIG. 1 illustrates schematically the basic functioning of the brake system 10, whereas FIG. 2 illustrates the brake system 10 schematically in detailed form.

Fundamental functioning of the brake system 10 is first explained in connection with FIG. 1.

The brake system 10 is designed to selectively apply pressure to and release it from at least two pressure connectors 16 for brake actuators, only one brake connector 16 being illustrated in FIG. 1.

Each of the pressure connectors 16 can be coupled to an associated brake actuator of a wheel 18 of the vehicle.

The master brake module 12 has an electrofluidic pressure-generating unit 20 which is designed to selectively pressurize a volume flow of hydraulic fluid and supply it to the pressure connectors 16.

The master brake module 12 additionally has a sensor 22 for detecting a fluid pressure in the master brake module 12. In one exemplary arrangement, the sensor 22 is a pressure sensor.

The auxiliary brake module 14 is configured to supply pressure to the pressure connectors 16 independently of the master brake module 12.

The auxiliary brake module 12 can be selectively coupled fluidically to the master brake module 12 or fluidically disconnected therefrom, as explained in greater detail below in connection with FIG. 2.

The auxiliary brake module 14 has a sensor 22 for detecting a fluid pressure in the auxiliary brake module 14. In one exemplary arrangement, the sensor 24 is a pressure sensor.

The brake system 10 additionally comprises a control unit 26 which is configured to monitor and compare a fluid pressure in the master brake module 12 and in the auxiliary brake module 14 by the measured values detected by the sensors 22, 24. The control unit 26 is in particular configured to draw a conclusion about the functional capability of the auxiliary brake module 14 based on the pressure and/or pressure curve in the master brake module 12 and/or in the auxiliary brake module 14.

The auxiliary brake module 14 comprises, in addition to the sensor 24, at least one auxiliary hydraulic fluid reservoir 28, at least one pressure generator 30 which is driven by an electric motor, and at least two valves 32, 33.

The auxiliary hydraulic fluid reservoir 28 is disconnected from a master hydraulic fluid reservoir 34 (see FIG. 2) of the master brake module 12.

The pressure generator 30 is illustrated in FIG. 1 as a single-piston pump. A double-piston pump is also conceivable, as is also illustrated in FIG. 2.

The pressure generator 30 is connected to the auxiliary hydraulic fluid reservoir 28 in order to draw in fluid.

To be more precise, the pressure generator 30 is configured to pressurize the hydraulic fluid present in the auxiliary hydraulic fluid reservoir 28 and supply it to the associated pressure connector 16.

Starting from the master brake module 12, a supply line 36 runs to the auxiliary hydraulic fluid reservoir 28. The supply line 36 serves to fill the auxiliary hydraulic fluid reservoir 28 when required.

As can be seen in FIG. 2, arranged in the supply line 36 is a non-return valve 37 which allows the auxiliary hydraulic fluid reservoir 28 to be filled only when the fluid pressure in the master brake module 12 is greater than in the auxiliary brake module 14.

A further pressure sensor 39 can optionally be arranged in the supply line 36 for control purposes. The pressure sensor 39 is also connected to the control unit.

The auxiliary brake module 14 comprises a fluid circuit 38 in which the at least one pressure generator 30 and the sensor 24 for detecting the fluid pressure in the auxiliary brake module 14, and the valve 32 are arranged.

In one exemplary arrangement, the valve 32 is pretensioned into an open position in which it can allow the passage of hydraulic fluid irrespective of a direction of flow. In the closed position, the valve 32 is pressure-controlled on the outlet side. Specifically, the valve 32 acts as a non-return valve which allows the flow of fluid to the pressure connector 16 but blocks the flow of fluid away from the pressure connector 16.

The valve 32 is, for example, a proportional valve.

When the valve 32 is open, hydraulic fluid can be pumped in a loop in the fluid circuit 38.

The fluid circuit 38 begins downstream from the auxiliary hydraulic fluid reservoir 28, for example relative to a state in which hydraulic fluid flows from the auxiliary hydraulic fluid reservoir 28 to the pressure connector 16. In other words, the fluid circuit 38 is arranged between the auxiliary hydraulic fluid reservoir 28 and the pressure connector 16.

A connecting line 42 runs from the auxiliary hydraulic fluid reservoir 28 to the fluid circuit 38.

The auxiliary brake module 14 moreover has a bypass path 44 which bypasses the auxiliary hydraulic fluid reservoir 28. The master brake module 12 is fluidically connected to a pressure connector 16 via the bypass path 44.

The bypass path 44 bypasses the at least one pressure generator 30.

The valve 33, which is a switch valve, is arranged in the bypass path 44.

The valve 33 is pretensioned into an open position in which it can allow the passage of hydraulic fluid irrespective of the direction of flow.

In its closed position, the valve 33 is pressure-controlled on the outlet side. Specifically, the valve 33 acts as a non-return valve which allows the passage of fluid only in the direction of the pressure connector 16.

Both the valve 32 and the valve 33 are electrically actuatable and can be actively closed by being actuated.

The bypass path 44 and the fluid circuit 38 can have a common line section 48 which leads to the pressure connector 16. This contributes to a compact structure.

The brake system 10 moreover comprises a sensor unit 50 for detecting a volume displaced by the electrofluidic pressure-generating unit 20.

The sensor unit 50 is integrated into the master brake module 12.

The sensor unit 50 is also connected to the control unit 26.

FIG. 2 illustrates schematically the brake system 10 from FIG. 1 in a detailed form.

The following description will go into detail mainly about the components which are illustrated in addition to FIG. 1 in order to avoid repetition. In one exemplary arrangement, the master brake module 12 will be described in detail in connection with FIG. 2.

The brake system 10 is designed to be used in a vehicle with four wheels 18*a*, 18*b*, 18*c*, 18*d*.

The brake system 10 therefore has a total of four pressure connectors 16*a*, 16*b*, 16*c*, 16*d* for brake actuators 52*a*, 52*b*, 52*c*, 52*d*. Pressure can be selectively applied to and released from them by the brake system 10.

In the exemplary arrangement illustrated, a brake actuator 52*a*, which is associated with a front right wheel 18*a* of the vehicle, is joined to the pressure connector 16*a*.

A brake actuator 52*b*, which is associated with a rear left wheel 18*b*, is joined to the pressure connector 16*b*.

The pressure connector 16*c* is fluidically connected to a brake actuator 52*c*, which is associated with a rear right wheel 18*c*, and the pressure connector 16*d* to a brake actuator 52*d*, which is associated with a front left wheel 18*d*.

All four wheels of the vehicle can thus be braked by the brake system 10.

In order to supply pressure to and release pressure at the pressure connectors 16*a*, 16*b*, 16*c*, 16*d*, the brake system 10, for example the master brake module 12, has a master cylinder unit 54. The master cylinder unit 54 can be actuated by a driver by a brake pedal 55 in a known manner in order to initiate a braking procedure.

As a result, the master cylinder unit 54 can serve as a fallback of the master brake module 12 in manual driving mode, i.e. not in self-driving mode.

For this purpose, the master cylinder unit 54 comprises a fluidic master brake cylinder 56 which is equipped with a first piston 58 and a second piston 60.

A first pressure chamber 62, via which a first pressure line 64 can be pressurized, is here provided between the first piston 58 and the second piston 60.

On a side facing away from the first piston 58, the second piston 60 delimits a second pressure chamber 66 by which a second pressure line 68 can be fed.

The master cylinder unit 54 is moreover fluidically connected to the master hydraulic fluid reservoir 34. To be more precise, a supply line 70 leads from the master hydraulic fluid reservoir 34 into the first pressure chamber 62, and a further supply line 72 from the master hydraulic fluid reservoir 34 into the second pressure chamber 66.

The master cylinder unit 54 is furthermore coupled to a simulator unit 76. This serves to supply a restoring force to the brake pedal 55.

Since such simulator units 76 and their connection to a master cylinder unit 54 are known, they will not be explained in detail in the present document.

FIG. 2 also shows the electrofluidic pressure-generating unit 20.

This comprises an electric drive motor 78 which is coupled in driving fashion to a linearly movable piston 80.

The piston 80 is guided in a cylinder 82 which can be supplied on one side with hydraulic fluid from the master hydraulic fluid reservoir 34 via a supply line 84 and on the other side can feed hydraulic fluid under pressure into an outlet line 86.

In the exemplary arrangement illustrated, the cylinder 82 acts on the outlet line 86 via a first supply line 88 and a second supply line 90. In addition, the piston 80 is configured with an internal fluid duct 92. This design makes it possible, in a manner known per se, for the piston to feed hydraulic fluid under pressure into the outlet line 86 both in a stroke in a direction away from the drive motor 78 and in a stroke in a direction towards the drive motor 78. Pistons of this type are also referred to as double-acting pistons.

A volume flow of hydraulic fluid, which is removed from the master hydraulic fluid reservoir 34, can thus be selectively pressurized both by the master cylinder unit 54 and also by the electrofluidic pressure-generating unit 20.

When not in self-driving mode, a hydraulic fluid can be pressurized by actuating the brake pedal 55 via the two pressure lines 64, 68 of the master cylinder unit 54 if the electrofluidic pressure-generating unit 20 of the master brake module 12 fails.

This pressurized volume flow is then supplied to the inlet of a first selector valve 94 and to the inlet of a second selector valve 96.

The first selector valve 94 is here coupled on the outlet side to the pressure connectors 16*c*, 16*d*. The fluid lines between the first selector valve 94 and the pressure connectors 16*c*, 16*d* can here be referred to as the first brake circuit.

In the same way, the second selector valve 96 is coupled on the outlet side to the pressure connectors 16*a*, 16*b*. The fluid lines between the second selector valve 96 and the pressure connectors 16*a*, 16*b* can thus be referred to as the second brake circuit.

The two selector valves 94, 96 can each assume two switching positions.

They are thus in each case pretensioned into a switching position which is provided to conduct a pressurized volume flow of hydraulic fluid to the respective associated pressure connectors 16*a*, 16*b*, 16*c*, 16*d* by the master cylinder unit 54, i.e. via the pressure lines 64 and 68. In these valve positions, although the electrofluidic pressure-generating unit 20 is also connected to the pressure connectors 16*a*, 16*b*, 16*c*, 16*d* via non-return valves arranged inside the selector valves 94, 96, the non-return valves serve essentially to release the pressure of the electrofluidic pressure-generating unit 20 and the associated fluid lines. They are not only intended to supply pressure to the pressure connectors 16*a*, 16*b*, 16*c*, 16*d*.

The selector valves 94, 96 can also be transferred into a second valve position by electrical actuation. This is intended to supply a pressurized volume flow of hydraulic fluid to the pressure connectors 16*a*, 16*b*, 16*c*, 16*d* by the electrofluidic pressure-generating unit 20. In this valve position, the master cylinder unit 54 is fluidically disconnected from the pressure connectors 16*a*, 16*b*, 16*c*, 16*d*. It interacts only with the simulator unit 76. This valve position corresponds to normal operation of the brake system 10.

Adjoining the two selector valves 94, 96 in the direction of the pressure connectors 16*a*, 16*b*, 16*c*, 16*d* in terms of the flow is a pressure modulation unit 98 which, together with a control unit which is not illustrated in greater detail and the brake actuators 52*a*, 52*b*, 52*c*, provides the functionality of an antilock braking system in a known manner.

In this connection, an ABS shut-off valve 100*a* and an ABS drain valve 102*a* are associated with the pressure connector 16*a*. In the same way, an ABS shut-off valve 199*b* and an ABS drain valve 102*b* are associated with the pressure connector 16*b*. An ABS shut-off valve 100*c* and an ABS drain valve 102*c* are associated with the pressure connector 16*c*. An ABS shut-off valve 100*d* and an ABS drain valve 102*d* are associated with the pressure connector 16*d*.

Such valve connections are known per se and are therefore not explained in detail.

In the exemplary arrangement illustrated, the master cylinder unit 54, the electrofluidic pressure-generating unit 20, the simulator unit 76, the selector valves 94, 96 and the pressure modulation unit 98 are formed as a mechanically coherent unit which forms the master brake module 12.

The components of the master brake module 12 can be arranged in a common housing.

The auxiliary brake module 14 already described in connection with FIG. 1 is arranged between the pressure connectors 16*a*, 16*b*, 16*c*, 16*d* and the master brake module 12.

To be more precise, the pressure connectors 16*a*, 16*b*, 16*c*, 16*d* are connected to the pressure modulation unit 98 of the master brake module 12 via the auxiliary brake module 14.

It is apparent from FIG. 2 that the auxiliary brake module 14 has a plurality of branches 104*a*, 104*b*, 104*c*, 104*d* which are each fluidically connected to one of the pressure connectors 16*a*, 16*b*, 16*c*, 16*d*.

Only the branches 104*a*, 104*d* as described in connection with FIG. 1 are formed in the exemplary arrangement. The branches 104*b*, 104*c* have a simplified design and comprise only a pressure generator 30 and a fluid circuit 38 in which just one valve 33 is arranged in addition to the pressure generator 30. The structure of the auxiliary brake module 14 is consequently simplified and hence more cost-effective.

It is, however, also conceivable that each of the branches 104*a*, 104*b*, 104*c*, 104*d* is designed as illustrated in FIG. 1.

Functioning of the brake system 10 is explained below.

In the regular operation of the brake system 10, if all the components of the brake system 10 are functioning properly and fault-free, actuation of the brake pedal 55 by a driver is detected by the master cylinder unit 54. Alternatively, in self-driving mode a required deceleration of the vehicle can be specified by a higher-level control unit.

If it is intended for the vehicle to decelerate, hydraulic fluid is pressurized by the electrofluidic pressure-generating unit 20. The hydraulic fluid can be already present in the pressure-generating unit 20 or be removed from the master hydraulic fluid reservoir 34 when required.

The selector valves 94, 96 are accordingly in their switched state in which exclusively the pressure-generating unit 20 is connected to the pressure modulation unit 98.

In regular operation, the volume flow of hydraulic fluid is pressurized exclusively by the electrofluidic pressure-generating unit 20.

Such regular operation is also referred to as "brake-by-wire" operation because of the lack of a fluidic coupling between the master cylinder unit 54 and the pressure connectors 16*a*, 16*b*, 16*c*, 16*d*.

In regular operation, the auxiliary brake module 14 does not contribute to regulating the pressure at the pressure connectors 16*a*, 16*b*, 16*c*, 16*d*. The pressure generator 30 is not in operation.

The valve 33 in the bypass path 44 is open in regular operation such that hydraulic fluid can flow unhindered from the master brake module 12 to the respective pressure connector 16*a*, 16*d*.

In the branches 104*b*, 104*c* of the auxiliary brake module 14, the valve 32 is open such that hydraulic fluid can flow to the pressure connectors 16*b*, 16*c* in these branches 104*b*, 104*c* too.

Should it occur that the fluidic pressure-generating unit 20 or other essential components of the brake system 10 are not functioning properly, the auxiliary brake module 14 can be activated.

This means that the pressure generators 30 are activated in order to increase the fluid pressure at the pressure connectors 16*a*, 16*b*, 16*c*, 16*d*. The valves 32, 33 are in this case closed and act as non-return valves.

The pressure generator 30 can draw hydraulic fluid both from the auxiliary hydraulic fluid reservoir 28 and, with the ABS shut-off valve open, also from the master hydraulic fluid reservoir 34.

The auxiliary brake module 14 thus serves as a fallback for the master brake module 12.

According to the disclosure, the brake system 10 is configured to be able to check the functionality of the auxiliary brake module 14 without there being any need for the vehicle to be inspected in a garage. A high degree of safety with very little effort is ensured as a result.

The sequence of such a functional test will be described below.

First, the auxiliary brake module 14 is fluidically disconnected from the master brake module 12. In the exemplary arrangement, this happens by the ABS drain valves 102*a*, 102*b*, 102*c*, 102*d* being closed. In this state, no hydraulic fluid can flow back from the lines of the master brake module 12 into the auxiliary brake module 14.

The auxiliary brake module 14 is then activated in order to generate a defined pressure in the auxiliary brake module 14.

Specifically, the pressure generator 30, which first draws hydraulic fluid from the auxiliary hydraulic fluid reservoir 28, is activated. During the start-up phase, the pressure generator 30 has an increased fluid requirement which is supplied especially from the auxiliary hydraulic fluid reservoir 28.

For example, a pressure of up to 20 bar is generated in the auxiliary brake module 14. In this case, the functional test takes place when the vehicle is stationary, for example before it begins to be driven. A driver is completely unaware that a functional test is being performed.

It is also conceivable to activate the auxiliary brake module 14 only to such an extent that the pressure in the auxiliary brake module 14 is increased only slightly. In this case, a functional test is also conceivable whilst driving.

If a functional test takes place whilst driving, when the auxiliary brake module 14 is activated, the control unit 26 sends a signal to a vehicle acceleration unit. This can thereupon increase the torque of the motor in order to compensate for a possible slight braking effect which can occur when the auxiliary brake module 14 is activated. This means that the speed of the vehicle should remain as constant as possible during a functional test.

When required, if the ABS shut-off valve 100*a*, 100*b*, 100*c*, 100*d* is open, hydraulic fluid can be drawn out from the master hydraulic fluid reservoir 34 by the pressure generator 30.

The fluid pressure in the auxiliary brake module 14 consequently increases, which is detected by the sensor 22.

If the functional test takes place whilst driving, it is advantageous if the hydraulic fluid is pumped in a loop by the pressure generator 30 in the fluid circuit 38. The valve 32 in the fluid circuit 38 is open in this case, whereas the valve 33 in the bypass path 44 is closed.

After activation of the auxiliary brake module 14, the valve 32, if it was open in the first place, is also closed. The pressure in the auxiliary brake module 14 is thus initially maintained at a level.

The auxiliary brake module is then coupled to the master brake module 12. This is effected by at least one ABS shut-off valve 100*a*, 100*b*, 100*c*, 100*d* being opened.

In a first variant of the method, all the ABS shut-off valves 100*a*, 100*b*, 100*c*, 100*d* can be opened simultaneously. This means that the auxiliary brake module 14 is coupled to the master brake module 12 for all the pressure connectors 16*a*,

16$b$, 16$c$, 16$d$ simultaneously. As a result, all the branches of the auxiliary brake module 14 can be checked for faults simultaneously. Although this is advantageous in terms of the duration of the functional test, it is more difficult to pinpoint the location of faults.

In a further variant, the ABS shut-off valves 100$a$, 100$b$, 100$c$, 100$d$ are opened one after the other, i.e. the auxiliary brake module 14 is coupled to the master brake module 12 for the individual pressure connectors 16$a$, 16$b$, 16$c$, 16$d$ one after the other. In this variant, the method steps described below are performed separately for each individual pressure connector 16$a$, 16$b$, 16$c$, 16$d$ or for each branch 104$a$, 104$b$, 104$c$, 104$d$ of the auxiliary brake module 14. Only when one branch 104$a$, 104$b$, 104$c$, 104$d$ has been completely checked is the next branch checked.

After the auxiliary brake module 14 has been fluidically connected to the master brake module 12 for one pressure connector 16$a$, 16$b$, 16$c$, 16$d$ or all the pressure connectors 16$a$, 16$b$, 16$c$, 16$d$, the master brake module 12 is activated. The auxiliary brake module 14 is no longer active at this point in time. This means that the pressure generator 30 is switched off. At this point in time, when the auxiliary brake module 14 is functioning properly, a higher pressure is measured by the sensor 22 of the auxiliary brake module 14 than by the sensor 24 of the master brake module.

When the master brake module 12 is activated, this means that the electrofluidic pressure-generating unit 20 is active. The piston 80 is moved by the drive motor 78.

If the auxiliary brake module 14 has functioned properly, the auxiliary hydraulic fluid reservoir 28 is thus filled first, as a result of which no rise in pressure can be measured in either the auxiliary brake module 14 or the master brake module 12. This procedure is referred to as "replenishing".

The travel of the piston 80 is monitored by the sensor unit 50 and communicated to the control unit 26 for control purposes.

Only when the auxiliary hydraulic fluid reservoir 28 has been filled does the pressure in the master brake module 12 increase.

As soon as there is a pressure equilibrium in the master brake module 12 and in the master brake module 14, the valves 32, 33 open because of the fluid pressure acting in the master brake module 12, and both sensors 22, 24 measure a rise in pressure.

The control unit 26 monitors and compares the fluid pressure in the master brake module 12 and in the auxiliary brake module 14 by the measured values detected by the sensors 22, 24 and, based on the pressure and/or the pressure curve, can draw a conclusion about the functional capability of the auxiliary brake module 14.

For this purpose, suitable comparison values can be stored in the control unit 26. Alternatively or additionally, the control unit 26 can calculate the pressure prevailing in the auxiliary brake module 14 and in the master brake module 12, for example, from a drive output of the pressure generator 30, for example the speed, and/or the travel of the piston 80 and compare the calculated value with the actually detected values.

Should the control unit 26 find a fault or an inconsistency, a signal can be sent to a driver requiring them to visit a garage.

The invention claimed is:

1. A brake system for a vehicle that is designed to selectively apply pressure to and release it from at least two pressure connectors for brake actuators, and each of the pressure connectors are operatively coupled to an associated brake actuator of a wheel of the vehicle, the brake system comprising:

a master brake module which comprises an electrofluidic pressure-generating unit designed to selectively pressurize a volume flow of hydraulic fluid and supply it to the pressure connectors, an auxiliary brake module configured to supply a pressure to the pressure connectors independently of the master brake module, wherein the auxiliary brake module comprises at least one auxiliary hydraulic fluid reservoir configured as a dedicated fluid storage component and containing a stored volume of hydraulic fluid, wherein the auxiliary hydraulic fluid reservoir is distinct from and fluidically disconnected from a master hydraulic fluid reservoir of the master brake module during pressurization of the pressure connectors, and wherein the auxiliary brake module is operable to generate and supply brake pressure while fluidically isolated from the master brake module;

wherein te master brake module and the auxiliary brake module each have at least one sensor for detecting a fluid pressure in the respective brake module, and a control unit configured to monitor and compare a fluid pressure or pressure curve in the master brake module and in the auxiliary brake module and, based on the monitored values, draw a conclusion about the functional capability of the auxiliary brake module.

2. The brake system according to claim 1, wherein, starting from the master brake module, a supply line runs to the auxiliary hydraulic fluid reservoir.

3. The brake system according to claim 2, wherein the auxiliary brake module comprises at least one pressure generator which is driven by an electric motor, which is configured to pressurize the hydraulic fluid present in the auxiliary hydraulic fluid reservoir brake module and supply it at at least one of the pressure connectors.

4. The brake system according to claim 1, wherein the auxiliary brake module comprises at least one pressure generator which is driven by an electric motor, which is configured to pressurize the hydraulic fluid present in the auxiliary hydraulic fluid reservoir brake module and supply it at at least one of the pressure connectors.

5. The brake system according to claim 4, wherein the auxiliary brake module comprises a fluid circuit in which are arranged the at least one pressure generator and the sensor for detecting the fluid pressure in the auxiliary brake module, and a valve which acts as a non-return valve in its closed position.

6. The brake system according to claim 5, wherein the at least one pressure generator is connected to the auxiliary hydraulic fluid reservoir in order to draw in fluid.

7. The brake system according to claim 6, wherein the fluid circuit begins downstream from the auxiliary hydraulic fluid reservoir.

8. The brake system according to claim 5, wherein the fluid circuit begins downstream from the auxiliary hydraulic fluid reservoir.

9. The brake system according to claim 1, wherein the auxiliary brake module has a bypass path which bypasses the auxiliary hydraulic fluid reservoir, wherein the master brake module is fluidically connected to a pressure connector via the bypass path.

10. The brake system according to claim 9, wherein the bypass path-(44) bypasses the at least one pressure generator.

11. The brake system according to claim 9 wherein a valve, is arranged in the bypass path.

12. The brake system according to claim 1, wherein a sensor unit for detecting a volume displaced by the electro-fluidic pressure-generating unit is provided.

13. The brake system according to claim 11, wherein a sensor unit for detecting a volume displaced by the electro-fluidic pressure-generating unit is provided.

14. A method for performing a functional test of the brake system according to claim 1, comprising the following steps:

fluidically disconnecting the auxillary brake module from the master brake module, whilst while the auxiliary brake module is fluidically disconnected, actuating the auxiliary brake module to generate a defined brake pressure using hydraulic fluid stored in the auxiliary hydraulic fluid reservoir, subsequently fluidically coupling the auxiliary brake module to the master brake module and activating the master brake module, and determining a functional capability of the auxiliary brake module based on differences between the pressure curves generated while the modules are hydraulically isolated and subsequently coupled.

15. The method according to claim 14, wherein the auxiliary brake module is coupled to the master brake module either for all the pressure connectors at the same time or one after the other for the individual pressure connectors.

16. The method according claim 15, wherein the auxiliary brake module is deactivated before the master brake module is activated.

17. The method according to claim 16, wherein the control unit sends a signal to a vehicle acceleration unit when the auxiliary brake module is activated.

18. The method according to claim 14, wherein the auxiliary brake module is deactivated before the master brake module is activated.

19. The method according to claim 14, wherein the control unit sends a signal to a vehicle acceleration unit when the auxiliary brake module is activated.

* * * * *